United States Patent
Parvez

(10) Patent No.: US 10,064,342 B1
(45) Date of Patent: Sep. 4, 2018

(54) HIGH SPEED ROTARY-BLADE HEDGE TRIMMER

(71) Applicant: Syed Abu Parvez, Bay Shore, NY (US)

(72) Inventor: Syed Abu Parvez, Bay Shore, NY (US)

( * ) Notice: Subject to any disclaimer, the term of this patent is extended or adjusted under 35 U.S.C. 154(b) by 92 days.

(21) Appl. No.: 15/214,534

(22) Filed: Jul. 20, 2016

Related U.S. Application Data

(60) Provisional application No. 62/195,631, filed on Jul. 22, 2015.

(51) Int. Cl.
*A01G 3/047* (2006.01)
*A01G 3/053* (2006.01)

(52) U.S. Cl.
CPC .................... *A01G 3/0535* (2013.01)

(58) Field of Classification Search
CPC ....... A01G 3/047; A01G 3/053; A01G 3/0535
See application file for complete search history.

(56) References Cited

U.S. PATENT DOCUMENTS

| | | | | |
|---|---|---|---|---|
| 1,564,990 A | * | 12/1925 | Wittemann | A01G 3/0535 30/196 |
| 1,582,359 A | * | 4/1926 | Trowbridge | A01G 3/0535 172/41 |
| 1,728,272 A | * | 9/1929 | Haddad | A01G 3/0535 30/289 |
| 1,797,028 A | * | 3/1931 | Snyder | A01G 3/0535 30/228 |
| 1,983,420 A | * | 12/1934 | Underwood | A01G 3/0535 30/228 |
| 2,028,784 A | * | 1/1936 | Jennett | A01G 3/0535 30/276 |
| 2,091,827 A | * | 8/1937 | Mercatoris | A01G 3/0535 30/276 |
| 2,848,808 A | * | 8/1958 | Zifferer | A01D 34/84 30/124 |
| 3,389,464 A | * | 6/1968 | Reggio | A01D 34/63 30/264 |
| 3,711,946 A | * | 1/1973 | Troutman | A01G 3/0535 30/124 |
| 2017/0290262 A1 | * | 10/2017 | Zerbarini | A01D 34/90 |

FOREIGN PATENT DOCUMENTS

GB     1118247    *   6/1968
GB     2518594    *   4/2015

* cited by examiner

*Primary Examiner* — Hwei C Payer
(74) *Attorney, Agent, or Firm* — Shifrin Patent Law; Dan Shifrin

(57) ABSTRACT

An electric hedge trimmer is provided, comprising: an elongated frame, comprising: an elongated support bar having first and second ends; first and second brackets extending perpendicularly in a first direction from the first and second ends, respectively; and a top handle extending perpendicularly from the support bar in a second direction. The electric trimmer further comprises: an electric motor secured to the first bracket; a cutting bar having a first end coupled to the electric motor and having a second end coupled to the second bracket; a plurality of cutting blades spaced around to the cutting bar; and a main handle secured to the electric motor.

20 Claims, 10 Drawing Sheets

HIGH SPEED ROTARY-BLADE HEDGE TRIMMER

RELATED APPLICATION DATA

The present application is related to commonly-owned U.S. Provisional Application Ser. No. 62/195,631, entitled HIGH SPEED ROTARY BLADE HEDGE TRIMMER, filed on Jul. 22, 2015, which application is incorporated herein by reference in its entirety.

TECHNICAL FIELD

The present invention relates to reciprocating blade hedge trimmers.

BACKGROUND ART

One problem with conventional reciprocating-blade hedge trimmers is that it they are limited in their ability to cut thick branches due to the size of the gap between the teeth of the blades.

SUMMARY OF THE INVENTION

Embodiments of the present invention provide an electric hedge trimmer, comprising: an elongated frame, comprising: an elongated support bar having first and second ends; first and second brackets extending perpendicularly in a first direction from the first and second ends, respectively; and a top handle extending perpendicularly from the support bar in a second direction. The electric trimmer further comprises: an electric motor secured to the first bracket; a cutting bar having a first end coupled to the electric motor and having a second end coupled to the second bracket; a plurality of cutting blades spaced around to the cutting bar; and a main handle secured to the electric motor.

Embodiments of the present invention further provide an electric hedge trimmer, comprising: an elongated frame, comprising: an elongated support bar having first and second ends; first and second brackets extending perpendicularly in a first direction from the first and second ends, respectively; a top handle extending perpendicularly from the support bar in a second direction. The electric trimmer further comprises: an electric motor secured to the first bracket; a cutting bar having a first end coupled to the electric motor and having a second end coupled to the second bracket; a plurality of cutting blades spaced around to the cutting bar; and a main handle secured to the electric motor. The electric trimmer has: a first configuration comprising a vortex chamber having an arcuate surface removably secured between the first and second brackets, the vortex chamber including a baffle extending from the arcuate surface towards a center of radius of the vortex chamber, the vortex chamber and baffle configured to partially shield the blades; or a second configuration comprising a safety arm guard removably secured to the frame and configured to shield an operator from the cutting blades.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
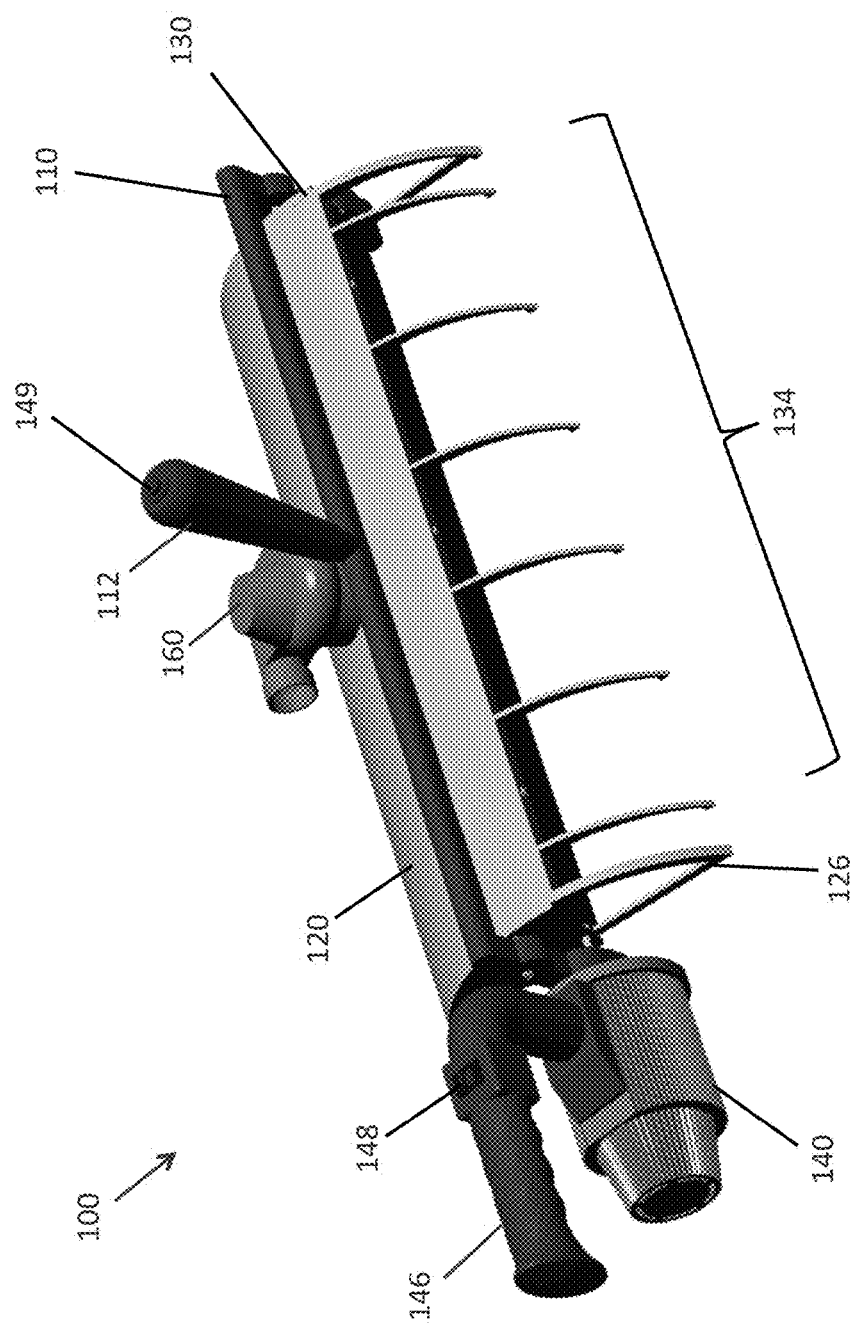
FIG. 1 is a top front perspective view of an embodiment of a high speed rotary-blade electric hedge trimmer of the present invention.
Figure 2:
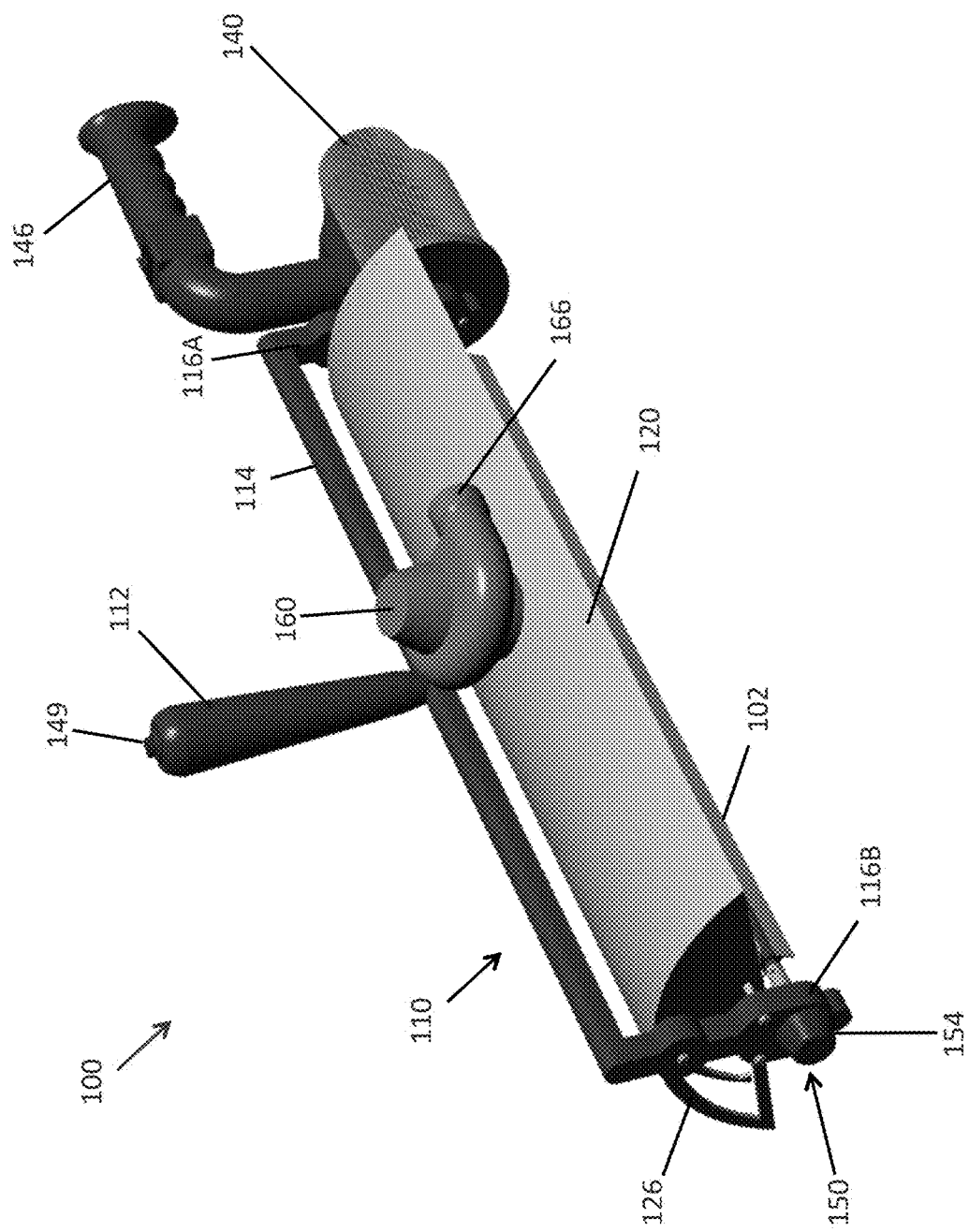
FIG. 2 is a top rear perspective view of the hedge trimmer of FIG. 1.
Figure 3:
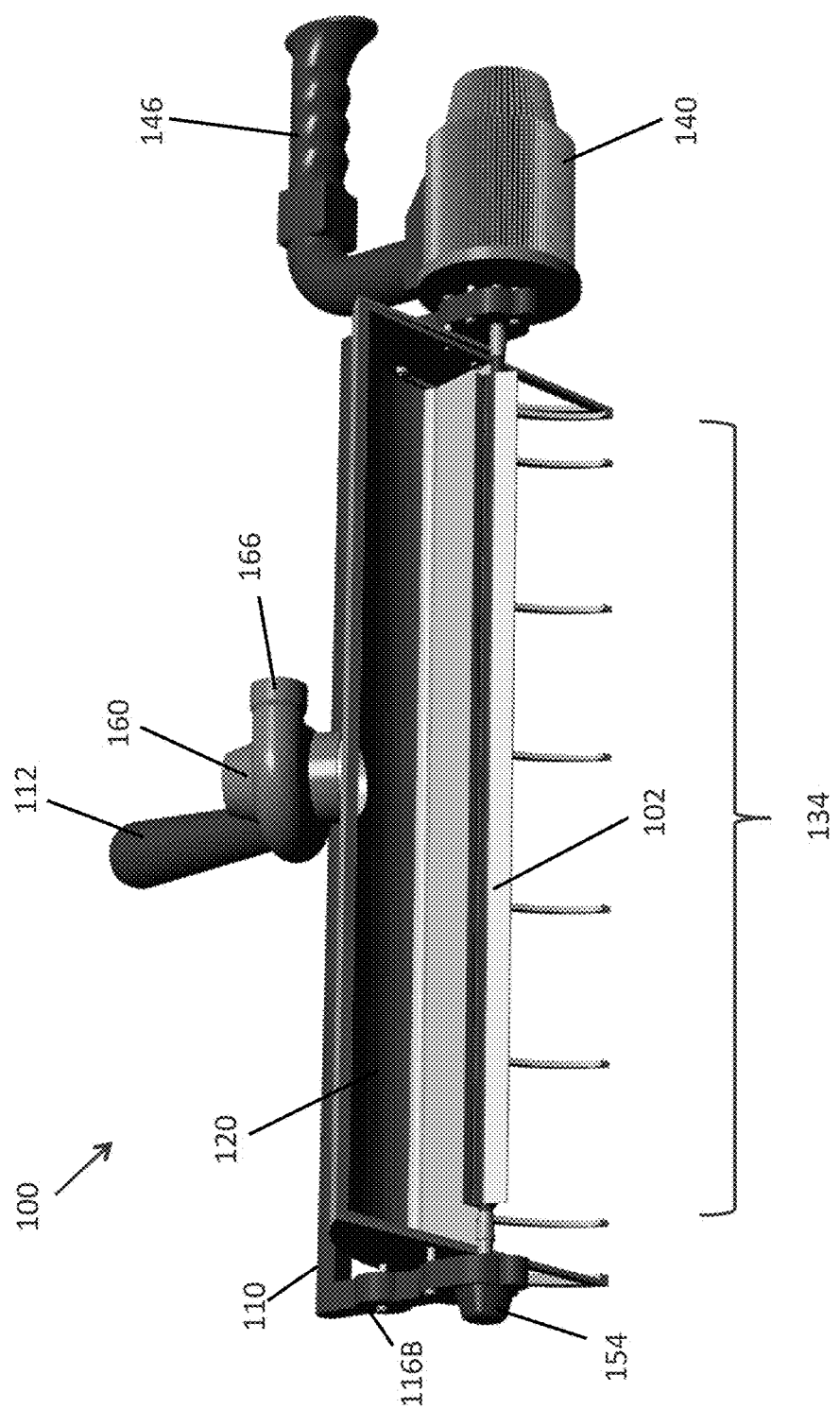
FIG. 3 is a perspective view of the underside of the hedge trimmer of FIG. 1.
Figure 4:
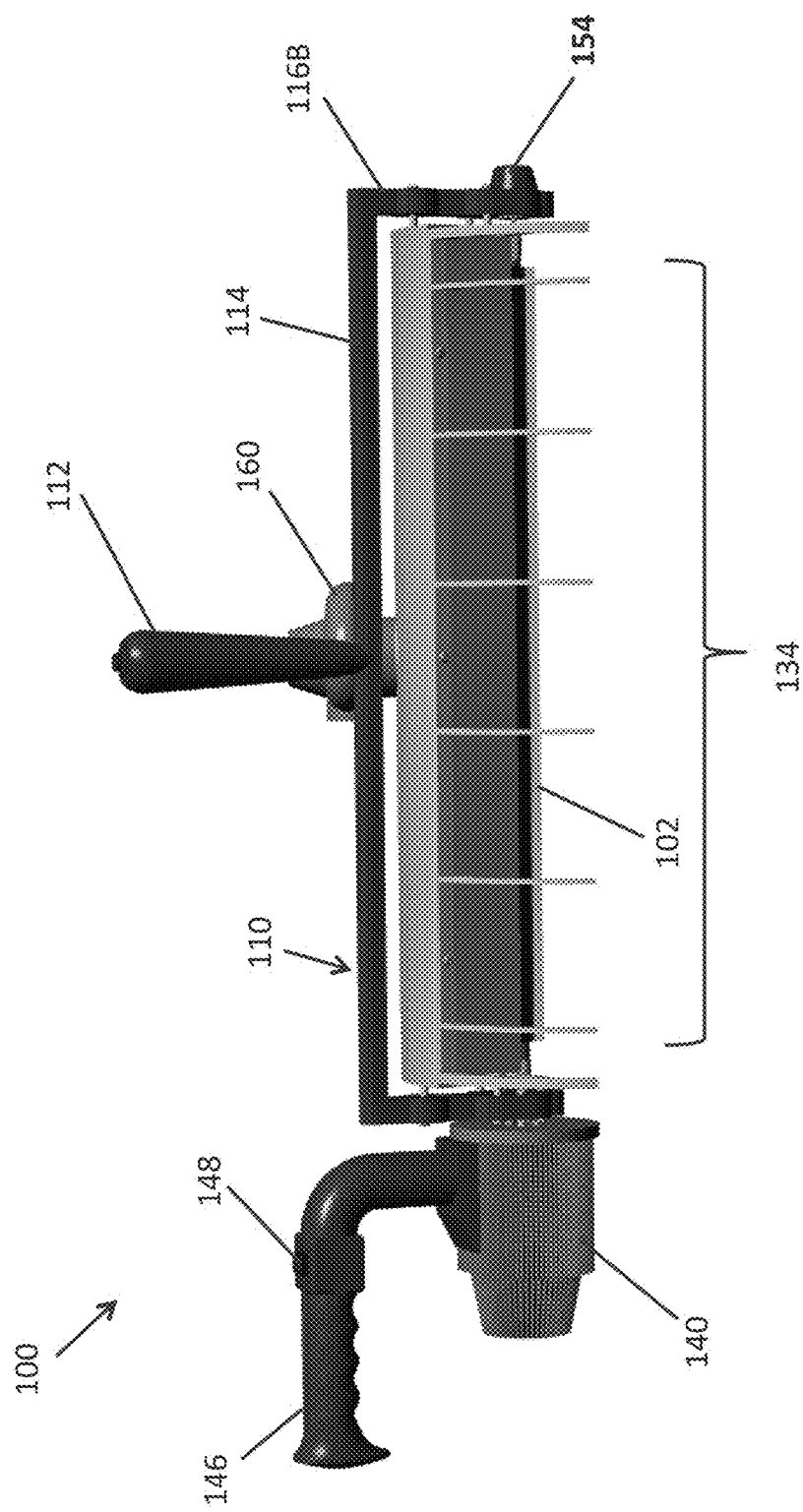
FIG. 4 is a front perspective view of the hedge trimmer of FIG. 1.
Figure 5:
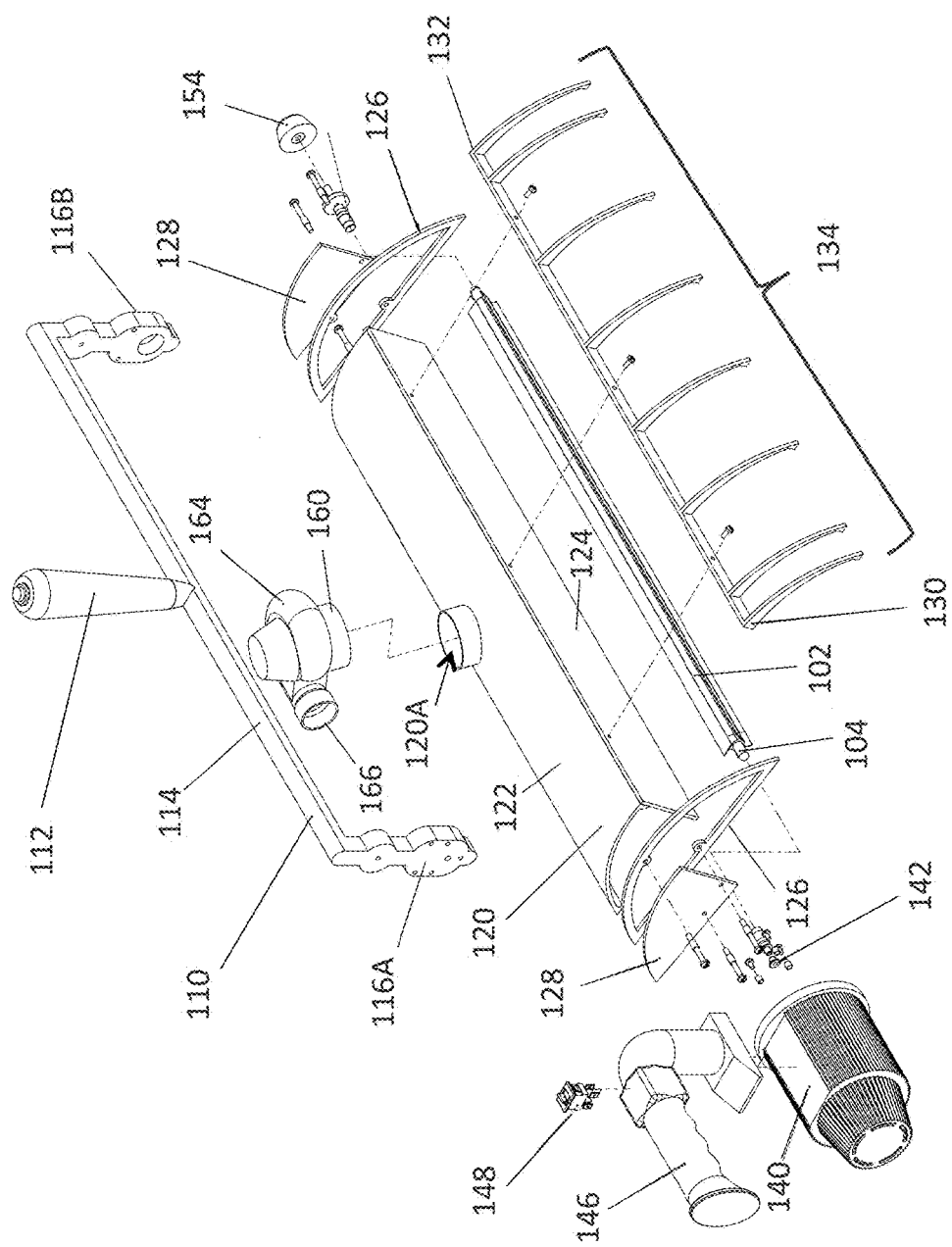
FIG. 5 is an exploded view of the hedge trimmer of FIG. 1.
Figure 6:
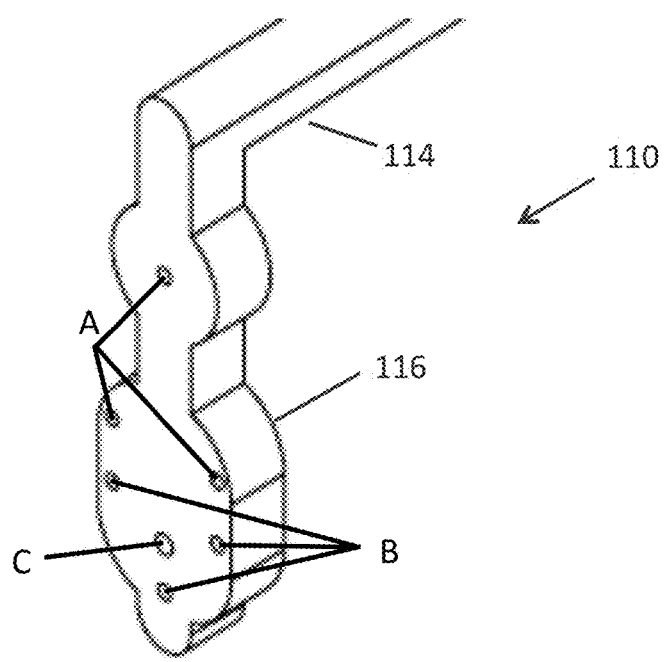
FIG. 6 is a close-up view of an end of the frame of the hedge trimmer of FIG. 1.

FIGS. 1-4 illustrate perspective views of an embodiment of a high speed electric hedge trimmer 100 of the present invention. FIG. 5 is an exploded view of the trimmer 100. In contrast to conventional, reciprocating-blade hedge trimmers, the trimmer 100 employs elongated rotary cutting blades 102. More specifically, the trimmer 100 includes an elongated frame 110 with a top handle 112 secured perpendicularly to the frame 110. The trimmer 100 also includes a removable vortex chamber 120 having a shape that, when in place, provides a hood covering the cutting blade 102. The vortex chamber 120 has an arcuate top surface 122 of approximately 90° relative to a center of radius and a baffle 124 extending perpendicularly towards the center of radius from a top edge of the top surface 122. Preferably, a plurality of strengthening ribs line the inner surface of the vortex chamber 120. A plurality of safety blades 130 may be secured to the vortex chamber 120 at the junction of the arcuate surface 122 with the baffle 124. The safety blades 130 comprise an elongated bar 132 to which a plurality of tines 134 are secured (or molded). The tines 134 extend away from the vortex chamber 120 and curve approximately 90° relative to the center of radius. A "former" 126 is secured to each end of the vortex chamber 120 to help provide additional rigidity to the vortex chamber 120. Each former 126 comprises an arcuate frame of approximately 180° and an elongated base between the ends of the arcuate frame 126A. When installed, each former 126 covers the edge of the vortex chamber 120 and safety blades 130 as seen in, for example, FIG. 5. An end cap 128 is secured to each former 126 to cover the open ends of the vortex chamber 120.

The cutting blades 102 are secured to a cutting bar 104. The blades 102 are preferably helical, each extending both around the cutting bar 104 and over the length of the cutting bar 104, to provide some vortex force towards the mulching module 160. Alternatively, the blades 102 may be linear, each extending linearly along the cutting bar 104. While any number of cutting blades 102 may be secured to the cutting bar 104, the number of blades 102 is preferably three or four. As will be described, the cutting bar 104 is driven by an electric motor 140. In the embodiment illustrated in the Figures, the rotating cutting blades 102 have a diameter of approximately ¾ inch and can cut branches up to approximately 1½ inches in diameter. Longer blades will allow the operator to cut larger branches, though practical limitations may be imposed by the size of the motor 140.

Figure 14:
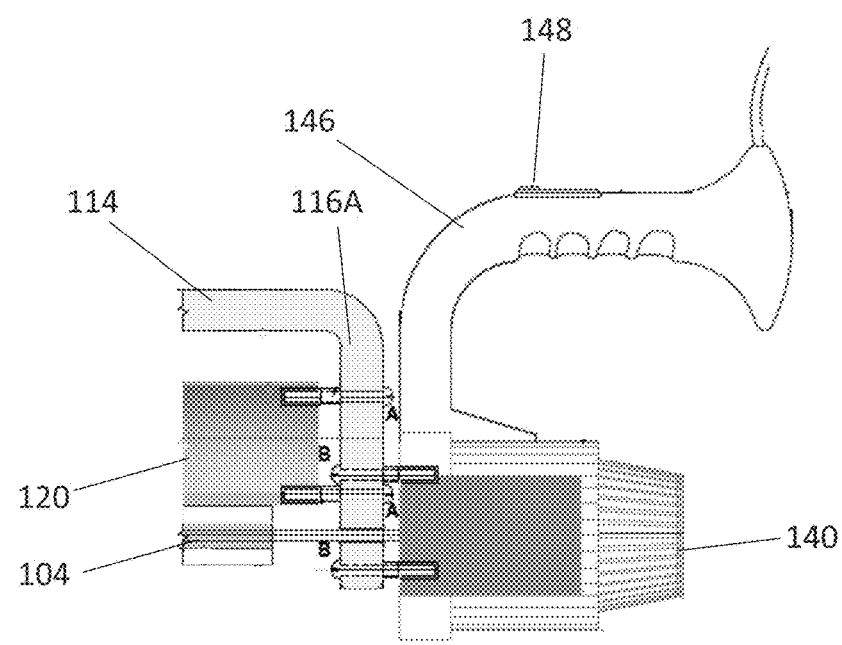
FIG. 14 is a cross-sectional view of the motor secured to one end of the frame of the hedge trimmer of FIG. 1.

In addition to the top handle 112, the frame 110 comprises an elongated support bar 114 with a bracket 116A, 1166 (collectively 116) on each end. As illustrated in the exploded view of FIG. 5 and in the close-up view of one end of the frame 110, the brackets 116A, 116B extend perpendicularly downward (towards the center of radius of the vortex chamber 120, and also to the center of radius of the cutting bar 104 and beyond) and have several openings formed therethrough. The vortex chamber 120, formers 126, and end caps 128 are secured to the frame brackets 116A, 116B with screws through the three A openings. The housing of the motor 140 is secured to a first frame bracket 116A through the three B openings. The C opening of the first bracket 116A provides an opening for a Delrin®-lined sleeve bushing 142 through which the drive shaft 156 of the motor 140 extends to couple with one end of the cutting bar 104 (see also FIG. 14). The C opening in the second bracket 116B is configured to receive a mechanism 150 (see FIGS. 8, 9) to tighten and loosen the cutting bar 104 for removal, replacement, and reversal. Spacers may be used between the frame brackets 116A, 116B and the vortex chamber 120 and between the frame brackets 116A, 116B and the motor 140.

Figure 15:
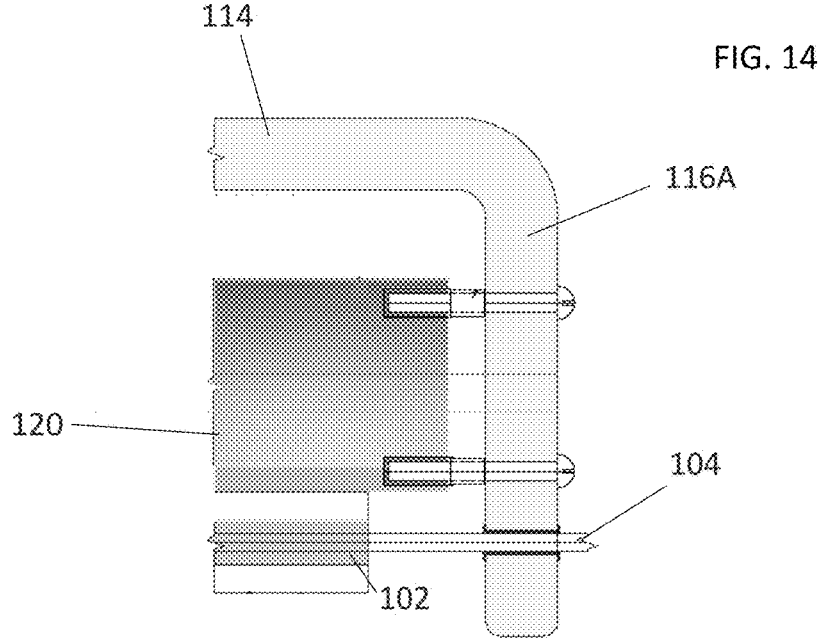
FIG. 15 is a cross-sectional view of the opposite end of the frame of the hedge trimmer of FIG. 1.

It will be appreciated that there are various ways in which to secure the cutting bar 104 to the motor 140 and frame brackets 116A, 116B. In the embodiment illustrated (see, for example, FIGS. 14, 15), the motor shaft and shank 156 may be coupled through the frame bracket 116A to the cutting bar 104 with a pin/hole joint 152 secured with a locking sleeve 159. A similar mechanism 150 may be used to couple the cutting bar 104 to the frame bracket 116B. As noted immediately above, the mechanism 150 also permits the user to tighten and loosen the cutting bar 104 for removal, replacement, and reversal. In addition to the pin/hole joint 152, the tensioning mechanism 150 may include a knob 154 secured to one end of a shaft and shank 156 that extends through the opening C in the frame bracket 116B. The shank 156 is secured to the inside ring of a roller bearing 158. The outer ring of the roller bearing 158 is secured to the cutting bar 104 via the pin/hole joint 152.

Figure 8:
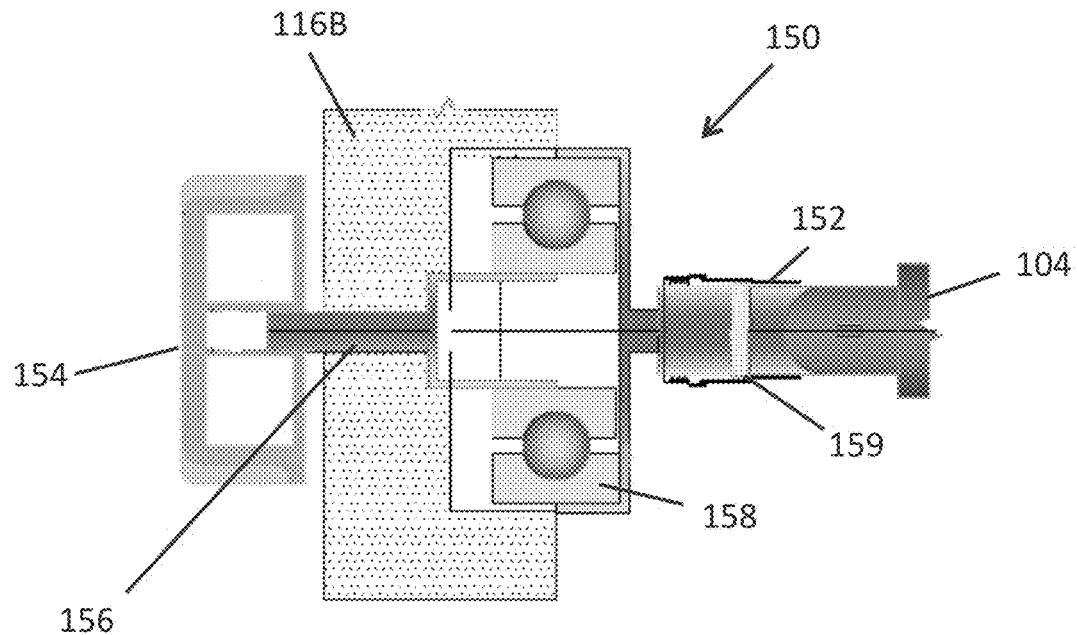
FIG. 8 is a cross-sectional view of an embodiment of a tensioning mechanism in a loosened configuration.
Figure 9:
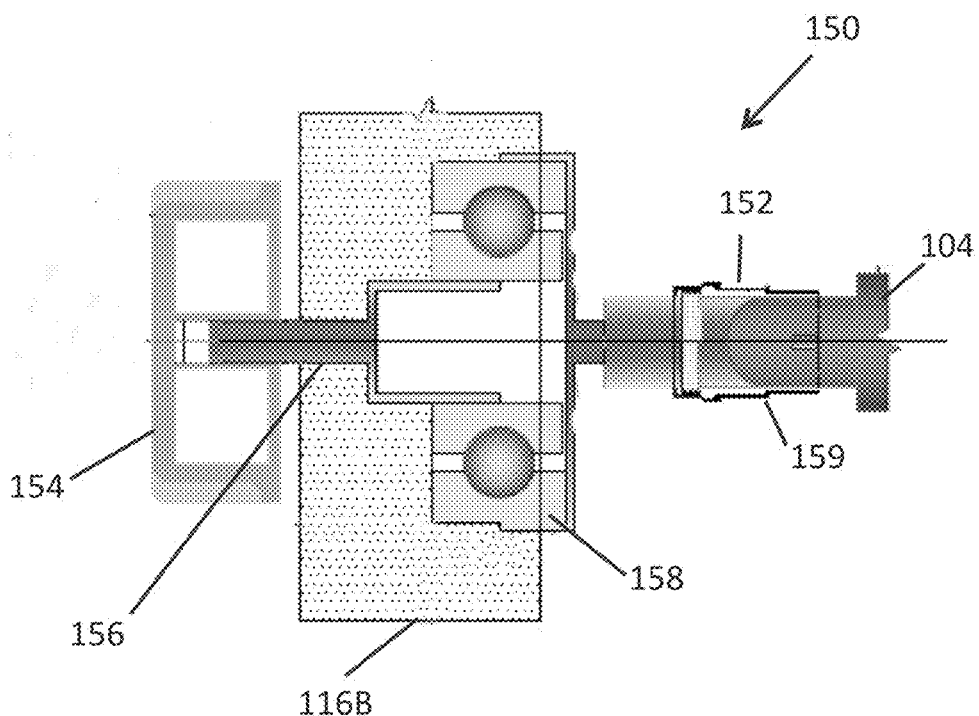
FIG. 9 is a cross-sectional view of the tensioning mechanism of FIG. 8 in a tensioned configuration.

To secure the cutting bar 104 to the motor 140 and frame bracket 116B, the tensioning mechanism 150 is loosened by unscrewing the tensioning knob 154, thereby moving the roller bearing 158 outward from the opening C in the frame bracket 116B. The ends of the cutting bar 104 are inserted into the pin/hole joints 152 and the locking sleeves 159, covering the ends of the cutting bar 104 and the respective shanks 156, are securely tightened (FIG. 8). The tensioning knob 154 may then be rotated to pull the roller bearing 158 into the opening C in the frame bracket 116B (FIG. 9), thereby securing the cutting bar 104 to the motor 140 and frame bracket 1166. To remove the cutting bar 104, the process is reversed. The bearing includes ears connected to the inner race of the ball bearing (not shown), which ears be snug fit to and straddle the bracket 116B to prevent the ball bearing from free spinning. A pin/hole joint and safety sleeve in the other frame bracket 116A may be used to removably couple the other end of the cutting bar 104 to the motor shaft 156.

A main handle 146 may be secured to the top of the motor 140 and an electrical switch 148 secured to the main handle and wired between the motor 140 and a DC power source (not shown). In the embodiment illustrated, the switch 148 is a three-position slide switch. In a first position, current flows to the motor 140 in one direction; in a second position, current is reversed and flows to the motor 140 in the opposite direction; and, in a third position, the motor is off and no current flows. It will be appreciated that other types of mechanical and electronic switches may be used and that a means to vary the speed of the motor may be used as well, either integrated with the switch 148 or as a separate controller. Preferably, too, the top handle 112 includes a deadman safety switch 149 wired in series with the main switch 148. Consequently, the motor 140 will only operate if the operator holds deadman switch 149 is held closed, and power to the motor 140 will be cut off immediately if the operator releases the deadman switch 149.

Figure 10:
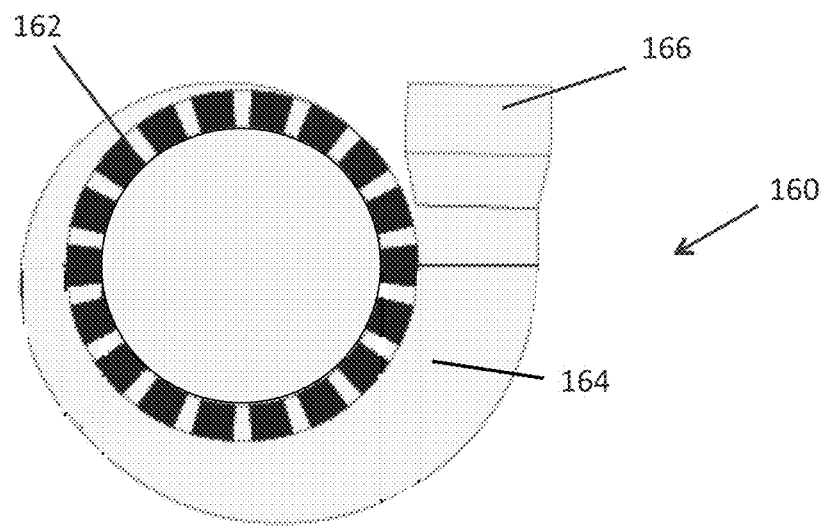
FIG. 10 is a cross-sectional view of an embodiment of a mulching module that may be used with the hedge trimmer of FIG. 1.

The embodiment illustrated in the Figures also includes a motorized mulching module 160 having an intake secured to an opening 120A in the top of the vortex chamber 120. An impeller 162 draws the clippings from the vortex chamber 120 into a volute chamber 164 (FIG. 10) and expels them through a chute 166 into a collection bag (not shown). It will be appreciated that the dimensions shown in FIG. 10 are merely representative and not limiting.

The trimmer 100 is preferably powered by a rechargeable battery pack (not shown) that may be secured to the trimmer 100 or, to reduce the weight the operator has to hold, be worn in a belt pack. For example, a 56 volt, 4.0 mah rechargeable battery pack may be used to power the two motors. The main motor 140 may be a 1,750 watt DC motor capable of approximately 20,000 revolutions per minute. The motor in the mulching module 160 may be a 400 watt DC pancake motor. The cutting bar 104 may be a Dyneema bar with stainless steel blades 102, such as three. The handles 146, and the vortex chamber 120 may be formed from any appropriate material, including being double-walled with an outer skin of, for example, Fiberglas reinforced polymer (GFPR) and an inner skin of, for example, a ballistics grade polymer or Dyneema®. The volute chamber 164 may also be formed from any appropriate material, including Dyneema and GFPR, which provides weight and cost savings. The frame 110 and other components may be also formed from any appropriate material, such as carbon reinforced polymer with cyanate ester resin (CFPR) and Dyneema.

Figure 11:
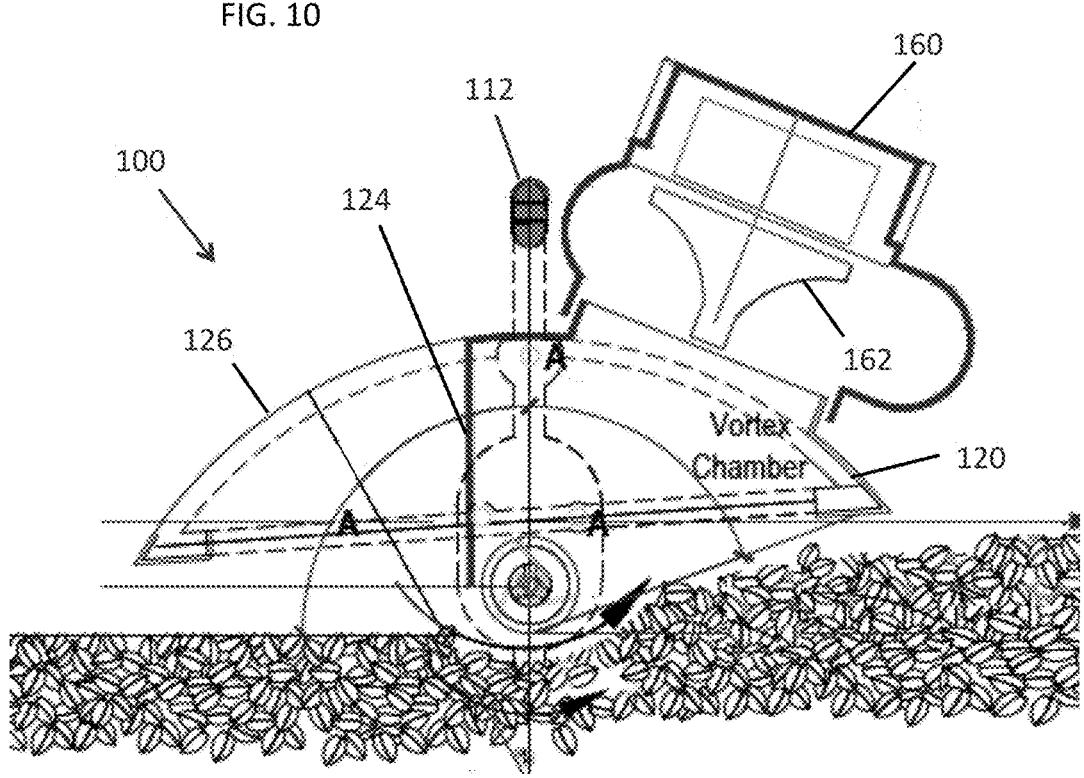
FIG. 11 is a cross-sectional view of the hedge trimmer of FIG. 1 during a trimming operation.
Figure 12:
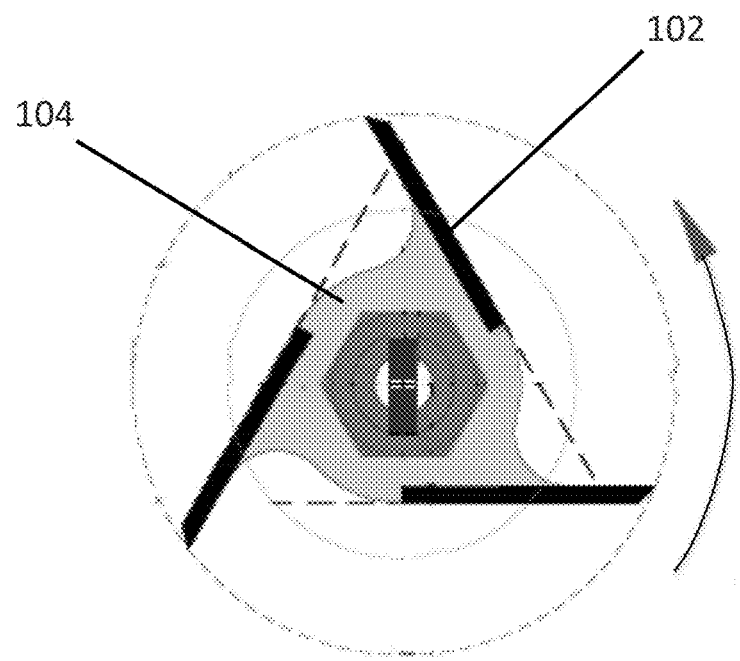
FIG. 12 is a cross-sectional view of an embodiment of a cutting bar and blades in a first configuration.

FIG. 11 illustrates a cross-sectional view of the hedge trimmer 100 in use. The operator holds the trimmer 100 with a hand on each handle 112, 146 and turns the switches 148, 149 on. With the cutting bar 104 and blades 106 turning, the operator may move the trimmer 100 along the top of the hedge being trimmed (left to right in FIG. 11). The main switch 148 is set to have the blades 102 turning in a direction such that their cutting edge faces the direction of travel when they are at the bottom of their rotation (counter-clockwise in FIGS. 11 and 12). The baffle 124 and safety blades 130 of the vortex chamber 120 prevent clippings from being thrown out of the vortex chamber 120. Instead, they are drawn into the mulching module 160 for collection. In the configuration illustrated, the trimmer 100 is able to remove approximately 1¾ inch of hedge in one pass, which is the approximate distance between the bottom of the vortex chamber 120 and the bottom of the cutting circle of the blades 102.

Figure 7:
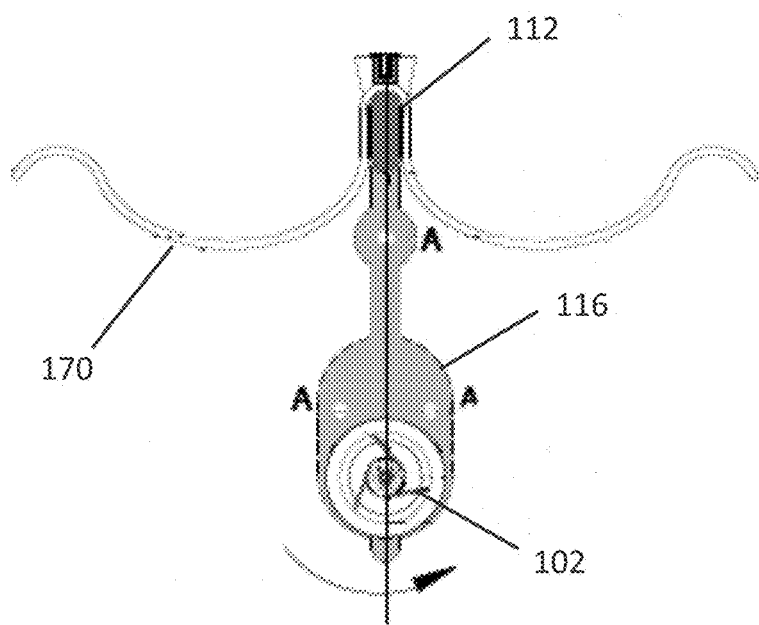
FIG. 7 is a cross-sectional view of the frame of the hedge trimmer of FIG. 1.
Figure 13:
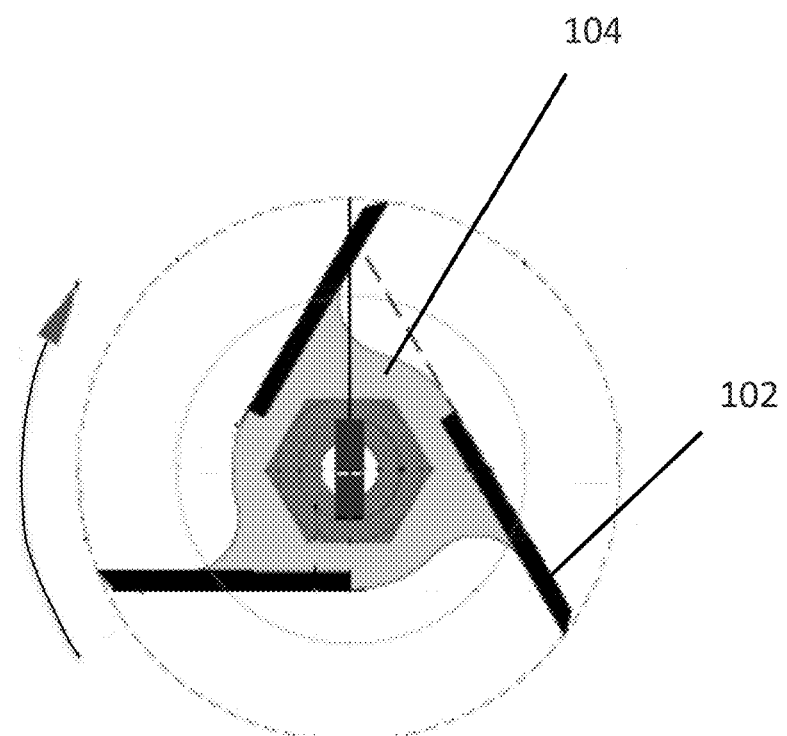
FIG. 13 is a cross-sectional view of the cutting bar and blades of FIG. 11 in a second configuration.

For a greater depth of cut, the trimmer 100 may be reconfigured by removing the vortex chamber 120 and safety blades 130 and reversing the cutting bar 104 and blades 102. A safety arm guard 170 may be secured to the frame 110 (FIG. 7). The operator reverses the direction of the cutting blades 102 (FIG. 13) and is able to remove approximately 3½ inches of hedge in one pass, which is the approximate distance between the bottom of the arm guard 170 and the bottom of the cutting circle of the blades 102. In contrast with the previously described first configuration, clippings are not collected through the mulcher module 160 but must be cleaned later from where they fall on the hedge or the ground. Additionally, while the arm guard 170 provides some protection for the operator, the blades 102 are not covered by the vortex chamber 120, which also serves as a safety shield.

The trimmer 100 may be manufactured in any practical cutting width. However, widths of 14 inches, 17 inches, and 20 inches are convenient widths for both commercial and residential operators. It will also be appreciated that any dimensions indicated in the Figures are merely representative of an embodiment of the trimmer of the present invention and are not intended to be limiting.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An electric hedge trimmer, comprising:
   an elongated frame, comprising:
      an elongated support bar having first and second ends;
      first and second brackets extending perpendicularly in a first direction from the first and second ends, respectively; and
      a top handle extending perpendicularly from the support bar in a second direction;
   an electric motor secured to the first bracket;
   a cutting bar having a first end coupled to the electric motor and having a second end coupled to the second bracket;
   a plurality of cutting blades spaced around secured to the cutting bar; and
   a main handle secured to the electric motor.

2. The electric trimmer of claim 1, further comprising a safety arm guard removably secured to the frame and configured to shield an operator from the cutting blades.

3. The electric hedge trimmer of claim 1, further comprising a vortex chamber having an arcuate surface and removably secured between the first and second brackets, the vortex chamber including a baffle extending from the arcuate surface towards a center of radius of the vortex chamber, the vortex chamber and the baffle configured to partially shield the cutting blades.

4. The electric hedge trimmer of claim 3, further comprising a set of safety blades removably secured to the vortex chamber at a junction of the arcuate surface and the baffle.

5. The electric trimmer of claim 3, further comprising a mulching module having an intake secured to a port in the arcuate surface of the vortex chamber.

6. The electric trimmer of claim 5, wherein the mulching module comprises:
   a volute chamber; and
   a motorized impeller within the volute chamber configured to draw clippings cut by the cutting blades through the intake into the volute chamber and expel the clippings through an exit chute in the volute chamber.

7. The electric trimmer of claim 1, further comprising:
   a safety arm guard removably secured to the frame and configured to shield an operator from the cutting blades; and
   a vortex chamber having an arcuate surface and removably secured between the first and second brackets, the vortex chamber including a baffle extending from the arcuate surface towards a center of radius of the vortex chamber, the vortex chamber and the baffle configured to partially shield the cutting blades;
   wherein:
      the safety arm guard is securable to the frame when the vortex chamber is removed; and
      the vortex chamber is securable to the frame when the safety arm guard is removed.

8. The electric trimmer of claim 7, further comprising a switch electrically coupled between the motor and a power supply, the switch having:
   a first position in which no current is provided to the motor;
   a second position in which current of a first direction is provided to the motor, whereby the cutting blades rotate in a clockwise direction; and
   a third position in which current of a second direction is provided to the motor, whereby the cutting blades rotate in a counterclockwise direction.

9. The electric trimmer of claim 7, wherein the vortex chamber comprises:
   an outer skin of a Fiberglas reinforced polymer; and
   an inner skin of a ballistics grade polymer.

10. The electric trimmer of claim 7, wherein the vortex chamber comprises:
    an outer skin of a Fiberglas reinforced polymer; and
    an inner skin of Dyneema®.

11. The electric trimmer of claim 1, further comprising a deadman switch secured to the top handle and electrically coupled between the motor and a power supply.

12. The electric trimmer of claim 1, further comprising a tensioning mechanism configured to removably secure the cutting bar within the frame.

13. The electric trimmer of claim 12, wherein the tensioning mechanism comprises:
    a releasable pin/hole joint connectable to the second end of the cutting bar;
    a safety sleeve configured to removably cover the pin/hole joint when the second end of the cutting bar is secured to the tensioning mechanism;
    a tensioning knob; and
    a set of roller bearings having an outer race secured to the pin/hole joint and an inner race secured to the tensioning knob;
    whereby:
       after the second end of the cutting bar is connected to the pin/hole joint and the safety sleeve covers the pin/hole joint, when the tensioning knob is turned in a first direction, the set of roller bearings moves inward into an opening in the second bracket, thereby securing the cutting bar within the frame; and when the tensioning knob is turned in a second direction, the set of roller bearings moves outward from the opening in the second bracket, thereby loosening the cutting bar within the frame.

14. The electric trimmer of claim 1, wherein the cutting blades comprise helical blades each extending around the length of the cutting bar.

15. The electric trimmer of claim 1, wherein the cutting blades comprise linear blades each extending along the length of the cutting bar.

16. The electric trimmer of claim 1, wherein the cutting blades comprises three stainless steel blades.

17. The electric trimmer of claim 1, wherein the cutting bar comprises Dyneema®.

18. An electric hedge trimmer, comprising:
   an elongated frame, comprising:
      an elongated support bar having first and second ends;
      first and second brackets extending perpendicularly in a first direction from the first and second ends, respectively; and
      a top handle extending perpendicularly from the support bar in a second direction;
   an electric motor secured to the first bracket;
   a cutting bar having a first end coupled to the electric motor and having a second end coupled to the second bracket;
   a plurality of cutting blades secured to the cutting bar; and
   a main handle secured to the electric motor;
   the electric trimmer having:
      a first configuration comprising a vortex chamber having an arcuate surface removably secured between the first and second brackets, the vortex chamber including a baffle extending from the arcuate surface towards a center of radius of the vortex chamber, the vortex chamber and the baffle configured to partially shield the cutting blades; or
      a second configuration comprising a safety arm guard removably secured to the frame and configured to shield an operator from the cutting blades.

19. The electric hedge trimmer of claim 18, wherein the first configuration further comprises a mulching module, comprising:
   an intake secured to a port in the arcuate surface of the vortex chamber;
   a volute chamber; and
   a motorized impeller within the volute chamber configured to draw clippings cut by the cutting blades through the intake into the volute chamber and expel the clippings through an exit chute in the volute chamber.

20. The electric hedge trimmer of claim 18, wherein:
   when the electric trimmer is in the first configuration, the electric trimmer has a depth of cut of approximately 1¾ inches; or
   when the electric trimmer is in the second configuration, the electric trimmer has a depth of cut of approximately 3½ inches.

* * * * *